United States Patent Office 3,044,997
Patented July 17, 1962

3,044,997
ESTERS OF HYPONITROUS ACID AND THEIR USE AS POLYMERIZATION CATALYSTS
Leslie Seed, Northwich, England, assignor to Imperial Chemical Industries Limited, London, England, a corporation of Great Britain
No Drawing. Filed Jan. 17, 1958, Ser. No. 709,454
Claims priority, application Great Britain Jan. 30, 1957
11 Claims. (Cl. 260—89.1)

This invention relates to organic compounds of hyponitrous acid. More particularly it relates to novel esters of hyponitrous acid and their preparation, and it relates further to the use of these esters as catalysts for the polymerisation of ethylene to give solids of high molecular weight.

Some esters of hyponitrous acid are known, for example alkyl and aryl hyponitrites; other hyponitrous esters in which the organic residue contains at least one ether-oxygen atom are disclosed and claimed in U.S. Patent No. 2,913,481. The esters that form the subject of the present invention have however been unknown hitherto. They possess the following basic structure

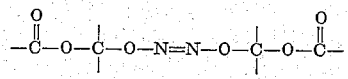

and have the general formula

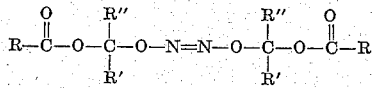

in which R represents an alkyl, cycloalkyl or aryl group which may be substituted and may be unsaturated and may be part of a dibasic acid; and in which R' represents hydrogen, or an alkyl or aryl group, which may contain an ether oxygen link and may be substituted and may be unsaturated; and in which R" is usually hydrogen though it may be an alkyl or aryl group, and it may form part of a cyclic structure with R' or may be the same as R'. These new esters are conveniently described as α-acyloxyalkyl hyponitrites and can in general be prepared by reactions between inorganic salts of hyponitrous acid and esters of organic carboxylic acids that carry a halogen substituent on the α-carbon atom of the alcohologenic portion of the ester.

According to our invention we provide new esters of hyponitrous acid that the α-acyloxyalkyl hyponitrites as hereinbefore defined.

Another feature of our invention is the use of these new esters as catalysts in the high-pressure polymerisation of ethylene to give solid polymers of high molecular weight. Yet another feature of the invention is the use of these new esters as catalysts in the polymerisation of other ethylenically unsaturated compounds.

Of the inorganic salts of hyponitrous acid used in the preparation of the new esters silver hyponitrite is particularly useful as it is readily prepared and is reactive. If desired hyponitrites of lead, copper, barium and lithium may be used.

The halogen substituent on the α-carbon atoms of the alcohologenic portion of the esters of organic carboxylic acids used in the preparation of the esters of our invention is preferably bromine, since chlorine-substituted esters are somewhat unreactive and iodine-substituted, though effective, require costly and relatively inaccessible intermediates.

Examples of such halogen-substituted esters are bromomethyl acetate; chloromethyl acetate; iodomethyl acetate; α-bromoethyl acetate; α-bromoethyl isobutyrate; bis(bromomethyl) succinate; bis(chloromethyl) adipate; the chloromethyl ester of the ethyl ether of lactic acid; chloromethyl benzoate; α-iodobenzyl benzoate; α-bromoethyl anisate; α-bromo, p-chlorobenzyl acetate; α-bromo, β-ethoxyethyl o-chloro-p-toluate; bromo, ethoxymethyl acetate; α-bromoethyl cyclohexancarboxylate; α-chloro, p-methoxybenzyl anisate; bromomethyl 3.5.5-trimethyl hexanoate; bromomethyl 2-ethylhexanoate; the mixed bromomethyl esters of naphthenic acids; the mixed bromomethyl esters which may ultimately be derived from the carbonylation product of propylene trimers. The halides may in general be readily prepared by the reaction which is fully described by R. Adams and his co-workers with many examples in the Journal of the American Chemical Society, vol. 40, p. 1732 (1918), vol. 43, pp. 651 and 661 (1921). The method consists of reaction of an acid halide with an aldehyde usually in the presence of a zinc chloride catalyst.

Although halides of the structure

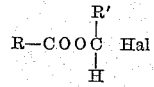

are well known, the related compounds

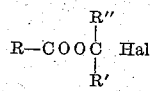

have not hitherto been described. They may however be made by similar preparative methods although rather stronger condensing agents such as AlCl₃ or BF₃ are desirable. The tertiary halides are extremely unstable in concentrated solution at ambient temperature and are therefore best kept in the cold and in dilute solution. In this respect they resemble the related compounds

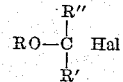

the decompositions of which have been thoroughly investigated by Strauss and Weber, Annalen 498, 101 (1932).

Examples of tertiary halides are 2-acetoxypropane-2 bromide; 1-acetoxycyclohexyl chloride; 1-valeroxycyclobutyl iodide; 2-(3.5.5-trimethylhexanoyloxy)butane-2 bromide; α-benzoyloxy, α-bromoethylbenzene; 2-anisoyloxypropane-2 iodide.

A convenient method of preparing the acyloxyalkyl hyponitrites is by reacting the corresponding bromoalkyl ester with silver hyponitrite in suspension in an inert non-aqueous solvent for example petroleum ether, diethyl oxalate, the diethyl ether of diethylene glycol, at temperatures of 0° C. and lower, and extracting the product with a suitable solvent after separating the precipitated silver bromide by filtration.

Examples of α-acyloxyalkyl hyponitrites that are included within the scope of our invention are acetoxymethyl hyponitrite; isobutyroxymethyl hyponitrite; α-isobutyroxyethyl hyponitrite; benzoyloxymethyl hyponitrite; acetoxy ethoxymethyl hyponitrite; α-acetoxybenzyl hyponitrite; α-acetoxyethyl hyponitrite; anisoyloxymethyl hyponitrite; p-dimethylaminobenzoyloxymethyl hyponitrite; o-chlorobenzoyloxymethyl hyponitrite; α-(p-chlorobenzoyloxy) o-chlorobenzyl hyponitrite; 3.5.5-trimethylhexanoyloxymethyl hyponitrite; 2-ethylhexanoyloxymethyl hyponitrite; caproyloxymethyl hyponitrite; trimethylacetoxymethyl hyponitrite; acetoxy-t-butylmethyl hyponitrite; crotonyloxymethyl hyponitrite; α-acetoxy-βββ-trichloroethyl hyponitrite; bis(2-acetoxypropane-2) hyponitrite; 1-acetoxycyclohexyl hyponitrite; 1-caproyloxycyclobutyl hyponitrite; bis[2-(3.5.5-trimethylhexanoyl)butane-2] hyponitrite; bis(1-benoyloxy 1-phenylethane-1) hyponitrite; bis(2-anisoyloxypropane-2) hyponitrite.

Of particular value for the purpose of obtaining fast polymerisation at low temperatures are acetoxymethyl hyponitrite which may be prepared readily in a pure and therefore highly active state, and 3.5.5-trimethylhexanoyloxymethyl hyponitrite which is both active and has a good solubility in hydrocarbon systems.

The acyloxymethyl hyponitrites generate free radicals by thermal decomposition and function as effective polymerisation catalysts in batch reactions within an approximate temperature range of −10° C. to 40° C. In special circumstances such as in continuous reactors or where special provision is made to remove large amounts of heat of polymerisation the acyloxymethyl hyponitrites may be used at higher temperatures, for example at 30°–100° C., in order to obtain extremely fast rates of polymerisation. For a given rate of polymerisation under standard conditions the acyloxymethyl hyponitrites may be used at temperatures some 15° C. lower than is possible with the alkoxyalkyl hyponitrites described in U.S. Patent No. 2,913,481, and some 75°–90° C. lower than the temperatures which are possible with lauroyl peroxide. Low polymerisation temperatures are valuable with ethylene, vinyl chloride, butadiene, propylene and their polymerisable mixtures as the products so obtained have properties different from those obtained at high temperatures. With ethylene the use of low polymerisation temperatures leads to products which have increased density, stiffness, and surface hardness.

Other hyponitrous esters described in this invention, for example α-acetoxyethyl hyponitrite, are more stable and decompose at higher temperatures; nevertheless they are useful in certain technical applications.

Among the monomers whose polymerisation it is possible to initiate by means of α-acyloxyalkyl hyponitrites are unsaturated compounds that contain one or more of the non-aromatic polymerisable groups

Typical of such are those that contain the vinyl group

and of these the simplest is ethylene. Dienes may also be polymerised by means of α-acyloxyalkyl hyponitrites, for example butadiene, chloroprene, fluoroprene, isoprene, cyclopentadiene, 1.4-hexadiene.

Vinyl or substituted vinyl compounds that may be polymerised include vinyl esters, for example vinyl acetate, vinyl chloride, vinyl benzoate; vinyl phthalimide, vinyl carbazole, acrylonitrile, acrylamide, styrene, halogenated styrene, methyl methacrylate, methacrylamide, isopropenyl acetate, vinyl ethyl ether.

When ethylene is to be polymerised with the aid of these catalysts operating pressures are usually greater than 500 atmospheres, preferably between 1000 and 2000 atmospheres.

Interpolymers between two or more of these compounds exhibiting the non-aromatic polymerisable group

may be made with the aid of these hyonitrites.

The polymerisation reactions, particularly that of ethylene, may be carried out if desired in the presence of chain-transfer agents, for example hydrogen, carbon tetrachloride, chloroform, bromotrichloromethane, or in the presence of diluents such as propane, ethane, methane.

The polymerisation reaction may be on a batch or continuous basis.

The invention, and the use of the hyponitrites it provides, is illustrated but not restricted by the following examples.

Example 1

5.5 gm. bromomethyl acetate, B.P. 129–133° C., prepared by the reaction of acetyl bromide with paraformaldehyde in the presence of anhydrous zinc chloride, was stirred at −15° C. with 5.5 gm. of silver hyponitrite suspended in 30 ccs. of diethyl oxalate. After 5 hours the solution was passed through a filter and the residue was washed twice with 5 cc. of solvent cooled to −15° C. The solution was found to contain 1.0% N and less than 0.2% Br on combustion analysis. Assuming 100% yield of acetoxymethyl hyponitrite, the solution should have contained 1.3% N. At room temperature the solution evolved nitrogen slowly, and at the boiling point of methanol rapidly. The nitrogen so evolved was collected over caustic potash and corresponded to the solutions containing 4.7% of dissolved acetoxymethyl hyponitrite against the 9.4% expected for a 100% yield. This indicates that acetoxymethyl hyponitrite is a thermally decomposable azo compound and yields nitrogen on decomposition.

0.5 cc. of the solution was charged to a high-pressure autoclave at −50° C. The autoclave was evacuated and purged three times with ethylene by admitting the gas to 10 atm. pressure and releasing it. Ethylene was then admitted to a pressure of 800 atm. and the internal stirrer was started. When the vessel was at 20° C. the pressure was adjusted to 1000 atm. After 3 hours the pressure had fallen to 960 atm. and the pressure was released. When the vessel was opened it contained 2.2 gm. of a solid, white, polymer of ethylene. This indicates that acetoxymethyl hyponitrite yields free radicals on decomposition at 20° C., and these radicals are capable of initiating the polymerisation of ethylene.

Example 2

A similar experiment was carried out with 5 gm. of each of the reagents in 40 ccs. of the diethyl ether of diethylene glycol for 3 hours at 0° C. After 1 hour the solution was filtered and the residue washed twice with 10 cc. portions of solvent. The 60 cc. combined filtrates contained 0.8% N and less than 0.2% Br on combustion analysis. The azo nitrogen obtained by thermal fission was consistent with the existence in the solution of 1.2% acetoxymethyl hyponitrite. When 2 cc. of this solution was charged to an autoclave containing ethylene at 30° C. and 1000 atm., 2.6 gm. of solid, tough, polyethylene was obtain in 1½ hours.

Example 3

5.9 gm. bromomethyl isobutyrate, B.P. 72–74°/44 mm., was stirred with 5.0 gm. silver hyponitrite suspended in 40 cc. dry petroleum ether at 0° C. for 3 hours. After filtration and washing, the combined filtrates were cooled to −50° C. for 18 hours. A small portion of yellow oil had separated to the bottom of the petroleum layer. On analysis this was found to contain 5.5% N and 5.5% Br (theory 10.6% N, 0.0% Br). The oil decomposed violently on heating and when redissolved in white spirit to the extent of 5%, evolved nitrogen at room temperature in an amount expected from a 2% solution. Hence the yellow oil was 40% isobutyroxymethyl hyponitrite. The yellow oil exhibited intense ester bands in the infra-red spectrum and in addition had a strong band at 985 cm.$^{-1}$ which has been found to be typical of organic hyponitrites.

Example 4

The compound $CH_3.CO.O.CH(OC_2H_5)Br$ is not known but may be prepared by reaction of acetyl bromide with diethoxymethyl acetate. Thus 16 gm. of diethoxymethyl acetate was added to 116 cc. of acetyl bromide at room temperature and the mixture refluxed for 1 hour; acid fumes were evolved. Rapid distillation of the mixture yielded a fraction of B.P. 134–138° C., containing much bromine but which lost bromine so rapidly that analysis was impossible. The preparative reaction belongs to a well known type (Mylo Ber. 44, 3214 (1911)) and is formulated

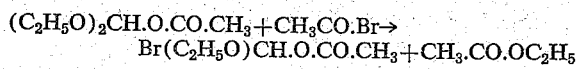

$(C_2H_5O)_2CH.O.CO.CH_3 + CH_3CO.Br \rightarrow$
$Br(C_2H_5O)CH.O.CO.CH_3 + CH_3.CO.OC_2H_5$ 16 gm. diethoxymethyl acetate was added dropwise to 20 cc. acetyl bromide at such a rate that the temperature of reaction was maintained at 40–42° C.; this required 40 minutes when cooling was by ambient air. No acid fumes were evolved and the hot reaction mixture was allowed to cool to room temperature. 10.3 gm. of the reaction product was stirred with 6 gm. silver hyponitrite in 30 cc. of the diethyl ether of diethylene glycol at −15° C. for 3 hours. The solution which contained acetoxyethoxymethyl hyponitrite was filtered and the residue washed. The combined filtrates were found to contain 0.5% N and 4.2% Br. 1 cc. of this solution was charged to compressed ethylene at 20° C. and 1000 atm. In 1½ hours the pressure fell by 20 atm. and 1.1 gm. solid polymer of ethylene was produced. When 0.001 gm. of acetyl bromide was added to compressed ethylene in the presence of a known-free radical initiator such as ethyl hyponitrite, the polymerisation was inhibited and no polymer was formed.

*Example 5*

5.5 gm. bromomethyl acetate and 5.5 gm. silver hyponitrite was stirred in 30 ml. of dry ether between −5° and −20° C. for 24 hours. The light-coloured residue was removed by filtration and washed with two 5 ml. portions of ether. The combined filtrates were evaporated at 0° C. and the residual liquid was dissolved in 20 ml. of dry methanol and cooled to −80° C. White crystals were separated on a filter at −80° C. and washed with two 5 ml. portions of cold methanol. The moist solid was then evacuated at 1 mm. and −15° C. for 2 hours.

The dry white solid had a melting point of 44.4° C. with vigorous decomposition. Unconfined, the crystals when suddenly heated above their melting point decomposed with some violence but did not detonate. On combustion analysis the crystals were found to contain no bromine and 13.7% N (calculated for acetoxymethyl hyponitrite 13.6% N). The infra-red spectrum showed strong bands at 994 and 970 cm.$^{-1}$ which are characteristic of the hyponitrite group. 0.1834 gm. of the pure acetoxymethyl hyponitrite was dissolved in 5 ml. of pure diethyloxalate at 0° C. and 1 ml. of the solution was slowly heated. Gas was evolved slowly at 0° C. and rapidly at 30° C. After the temperature had reached 120° C. it was found that 5.07 ml. of gas calculated at N.T.P. had been evolved; on analysis the gas was found to contain 87% $N_2$, 0.5 $H_2$ and 10% CO. The total quantity of nitrogen is 10% more than that required by theory, but considering the accuracy of the method this result is barely significant.

The solution in diethyl oxalate was used to initiate the polymerisation of ethylene as in Example 1. The reactions were so rapid that the temperature was virtually out of control but recorded details are as follows:

Approximately 0.02 gm. of the pure white acetoxymethyl hyponitrite was added to 5 ml. of purified monomer under nitrogen under the following conditions, and comparison was made with an identical sample to which no addition had been made.

| Monomer | Temp., °C. | Time, (hrs.) | Result |
|---|---|---|---|
| Vinyl acetate with catalyst | 25 | 0.08 | Self-heating polymerisation to solid. |
| Vinyl acetate without catalyst | 25 | 1.5 | No change. |
| Styrene with catalyst | 25 | 1.5 | 3.8% conversion. |
| Styrene without catalyst | 25 | 2.5 | No polymerisation. |
| Methyl methacrylate with catalyst | 25 | 2 | Syrup. |
| Do | 25 | 2.6 | Semi-solid. |
| Do | 25 | 3.6 | Brittle glass. |
| Methyl methacrylate without catalyst | 25 | 4 | No apparent change. |

*Example 6*

7.25 gm. iodomethyl acetate, 5.5 gm. silver hyponitrite were reacted in 30 ml. of dry ether as in Example 5. By similar treatment to the foregoing example a white crystalline solid was obtained, M.P. 45.5° C. with decomposition, which when added to vinyl acetate caused rapid polymerisation at 25.5° C.

*Example 7*

3.94 gm. acetoxymethyl chloride, 5.5 gm. of silver hyponitrite and 30 ml. of diethyl oxalate were stirred at 0° C. for 24 hours. At the end of this period the colour of the silver hyponitrite was not much altered but filtration of the solution and washing of the residue with 6 ml. of solvent yielded a solution 1 ml. of which decomposed to give 1.5 ml. of permanent gas on heating. 1 ml. of this solution caused 5 ml. of vinyl acetate to become solid in 1 hour at 25° C.

*Example 8*

In a similar manner 5.5 gm. of lead hyponitrite was reacted with 5.7 gm. of bromomethyl acetate in 30 ml. of dry ether at −20° C. for 22 hrs. After filtration and washing the filtrates were evaporated to yield a colourless liquid. 0.3524 gm. of the liquid yielded 5.55 ml. of permanent gas on decomposition and approximately 0.05 gm. of the liquid converted 5 ml. of methyl methacrylate to a solid glass in 1½ hrs. at 40° C.

*Example 9*

10.5 gm. of α-bromobenzyl benzoate was reacted with 5.5 gm. of silver hyponitrite in the presence of 90 ml. of dry ether at −20° C. for 24 hrs. After filtration the ether solution was evaporated to leave a mushy white solid which contained 1.2% N. 0.1 gm. of the solid evolved 0.6 ml. of gas (mainly nitrogen) on heating which corresponds to a content of 16% of α-benzoyloxybenzyl hyponitrite in the crude reaction product.

5 ml. of methyl methacrylate and approximately 0.02 gm. of the solid were heated overnight in an atmosphere of nitrogen at 40° C. During this time the methyl methacrylate was converted to a clear glass whereas an identical sample to which no addition had been made was apparently unchanged after the same treatment.

*Example 10*

5.5 gm. of bromomethyl benzoate and 7.8 gm. silver hyponitrite were stirred in the presence of 30 ml. of dry

| Catalyst Solution, ml. | Temp., °C. | Pressure, atm. | Additive | Reaction time, mins. | Polymer ||||
|---|---|---|---|---|---|---|---|---|
| | | | | | Weight, gm. | Density, gm./cc. | Melt Index | $CH_3/$ 100 C. |
| 0.7 | 20 | 1,000 | | 31 | 7.3 | 0.938 | 0.009 | |
| 0.35 | 20 | 2,000 | 5 atm. $H_2$ | 19 | 5.4 | 0.942 | 0.02 | |
| 0.35 | 0–8 | 2,000 | 0.25 ml. $CCl_4$ | 64 | 5.0 | 0.940 | 0.003 | |
| 0.35 | 10 | 2,000 | 2 ml. $C_3H_6$ | 400 | 1.3 | 0.939 | 0.007 | 0.5 | ether between −5° and −20° C. for 24 hrs. After evaporation of the ethereal filtrates the semi-solid residue was taken up in 10 ml. of dry methanol and a white solid separated from solution at −80° C. 0.3 gm. was recovered, of melting point 35–86° C.; it contained 1.8% N and no bromine.

0.02 gm. of the solid converted 5 ml. of methyl methacrylate to a clear glass in 16 hrs. at a temperature of 50° C. under an atmosphere of nitrogen.

*Example 11*

5.8 gm. of α-bromoethyl acetate and 5.5 gm. of silver hyponitrite were reacted in a similar manner. Evaporation of the ethereal filtrates, ultimately at a pressure of 1 mm. and at −15° C., yielded 2 ml. of yellow liquid which contained 6.2% N and 0.7% Br. 0.085 gm. of the liquid, when heated to 170° C., yielded 6.8 ml. of gas (measured at 23° C. and 30.226 inches of mercury). Constituents of the gas were $H_2$ 0.4%; $N_2O$ 17%; $N_2$ 45%; CO 10%; $CH_4$ 15%.

0.07 gm. of the liquid was used to polymerise ethylene as described in Example 1. At 110° C. and 1000 atm. pressure 2.9 gm. of tough solid polyethylene were obtained in 5 hrs. 20 mins.

*Example 12*

30 gm. of pure acetone was charged to a 250 cc. glass flask fitted with reflux converter and drying tubes; approximately 0.3 gm. of pure anhydrous aluminum chloride was added followed by 63.7 gm. of acetyl bromide. The solution became warm to the touch and turned yellow, but the process appeared to come to a halt after 30 mins. After standing overnight the liquid was a clear claret colour. The liquid was evaporated at the water pump at 0° C. and the residue then rapidly distilled. A clear distillate of B.P. 43–44° C./13 mm. was obtained. This turned yellow within minutes and after standing overnight in a refrigerator was dark red. The distillate contained reactive bromine and hydrolysis and titration immediately after distillation indicated the presence of 42.2% hydrolysable bromine (calculated for $CH_3.C.O.O.C(CH_3)_2Br$ 44.2%).

6.55 gm. of the freshly-prepared 2-acetoxypropane-2 bromide was reacted with 5.5 gm. silver hyponitrite in the manner described previously. The ethereal filtrates were evaporated and evacauted to yield 1.5 gm. of dark red liquid. This contained 9.2% N and 0.6% Br (calculated for bis(2-acetoxypropane-2) hyponitrite 10.6% N, 0.0% Br.

0.887 gm. of the liquid product was dissolved in 10 ml. of diethyl oxalate and 2.0 ml. of the solution was heated to decomposition; decomposition occurred between 130° C. and 160° C. to yield 10.9 ml. of gas (measured at 23° C. and 29.538 inches of mercury). The gas was found to contain $N_2$ 18%; $CO_2$ 16.5%; $N_2O$ 55%.

0.5 ml. of the diethyl oxalate solution was used to initiate the polymerisation of ethylene as described in Example 1. At 150° C. and 1000 atm. pressure 1.0 gm. of solid polyethylene was obtained in 4 hrs. 24 mins.

What I claim is:

1. An ester of hyponitrous acid having the general formula:

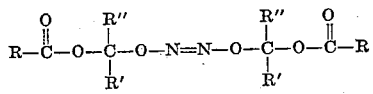

wherein R is selected from the group consisting of alkyl containing up to nine carbon atoms, allyl, phenyl, chlorophenyl, lower alkyl phenyl, lower alkoxy phenyl and lower alkylaminophenyl radicals; R' is selected from the group consisting of hydrogen, lower alkyl, lower alkoxy, lower alkoxy-lower alkyl, lower chlorophenyl, phenyl and chlorophenyl radicals and radicals which, together with the R" substituent, represent the atoms necessary to complete a saturated hydrocarbon ring containing from four to six carbon atoms; and R" is selected from the group consisting of hydrogen, lower alkyl and radicals which, together with the R' substituent, represent the atoms necessary to complete a saturated hydrocarbon ring containing from four to six carbon atoms.

2. Process for the manufacture of esters of hyponitrous acid which comprises reacting one mole of a metal hyponitrite selected from the group consisting of silver, lead, copper, barium and lithium hyponitrites with 2 moles of an organic carboxylic acid ester having the formula:

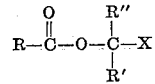

wherein X stands for halogen, R is selected from the group consisting of alkyl containing up to nine carbon atoms, allyl, phenyl, chlorophenyl, lower alkyl phenyl, lower alkoxy phenyl and lower alkylaminophenyl radicals; R' is selected from the group consisting of hydrogen, lower alkyl, lower alkoxy, lower alkoxy-lower alkyl, lower chloroalkyl, phenyl and chlorophenyl radicals and radicals which, together with the R" substituent, represent the atoms necessary to complete a saturated hydrocarbon ring containing from four to six carbon atoms; and R" is selected from the group consisting of hydrogen, lower alkyl and radicals which, together with the R' substituent, represent the atoms necessary to complete a saturated hydrocarbon ring containing from four to six carbon atoms, said reaction being carried out in an inert non-aqueous solvent for the said organic carboxylic acid ester at a temperature not above 0° C.

3. The process of claim 2 wherein the metal hyponitrite is silver hyponitrite and X is bromine, said hyponitrite and ester being reacted in an inert non-aqueous solvent at a temperature not above 0° C.

4. The proces of claim 3 wherein said ester is selected from the group consisting of bromomethyl acetate and bromomethyl 3.5.5-trimethyl hexanoate.

5. Process for polymerizing an ethylenically unsaturated compound selected from the class consisting of ethylene, propylene, vinyl acetate, vinyl chloride, styrene, methyl methacrylate, butadiene, and mixtures thereof which comprises contacting said compound with a catalytic quantity of a hyponitrous acid ester as defined in claim 1 at a temperature of from −10° C. to 100° C.

6. Process for the polymerisation of ethylene as claimed in claim 10 wherein the polymerisation is carried out in the presence of a chain-transfer agent selected from the group consisting of hydrogen, carbon tetrachloride and chloroform.

7. Acetoxymethyl hyponitrite.

8. 3.5.5-trimethylhexanoyloxymethyl hyponitrite.

9. Process as claimed in claim 5 in which the catalyst is selected from the group consisting of acetoxymethyl hyponitrite and 3.5.5-trimethylhexanoylmethyl hyponitrite.

10. Process as claimed in claim 9 in which the ethylenically unsaturated compound is ethylene and the polymerisation reaction is performed at a pressure greater than about 500 atmospheres and at a temperature below 100° C.

11. Process for the polymerisation of ethylene as claimed in claim 10 in which the pressure is between 1000 and 2000 atmospheres and the temperature is between −10° C. and 40° C.

References Cited in the file of this patent

UNITED STATES PATENTS

| | | |
|---|---|---|
| 2,473,929 | Wilson | June 21, 1949 |
| 2,535,189 | Benson et al. | Dec. 26, 1950 |
| 2,713,576 | De Benneville | July 19, 1955 |
| 2,824,096 | Heckert | Feb. 18, 1958 |
| 2,839,519 | Seed | June 17, 1958 |

FOREIGN PATENTS

| | | |
|---|---|---|
| 618,168 | Great Britain | Feb. 17, 1949 |